May 28, 1946.          C. A. CADWELL          2,401,048
                    RAIL BONDING APPARATUS
                    Filed Jan. 13, 1941          3 Sheets-Sheet 1
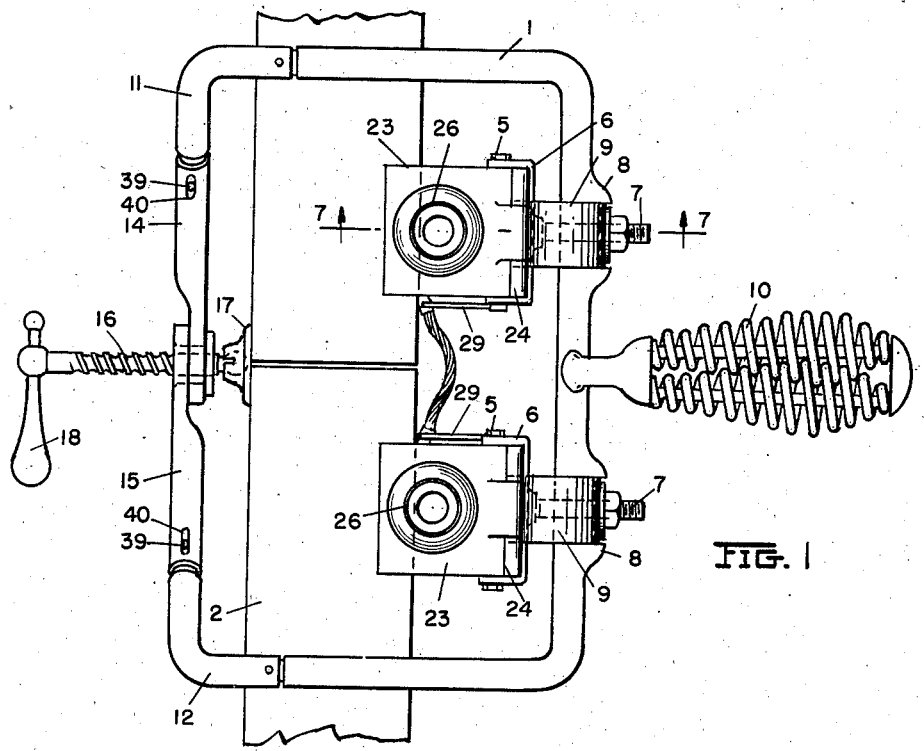
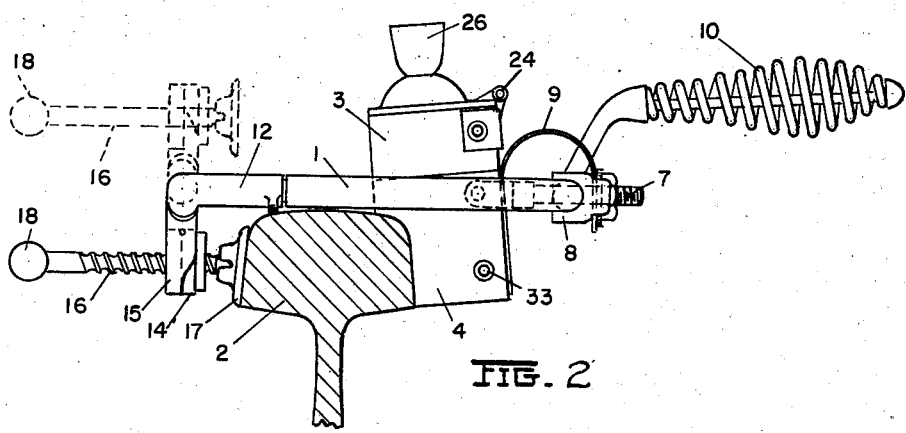
INVENTOR.
CHARLES A. CADWELL.
BY Oberlin, Limbach & Day.
ATTORNEYS May 28, 1946.   C. A. CADWELL   2,401,048
RAIL BONDING APPARATUS
Filed Jan. 13, 1941   3 Sheets-Sheet 2

INVENTOR.
CHARLES A. CADWELL
BY Oberlin, Limbach & Day
ATTORNEYS

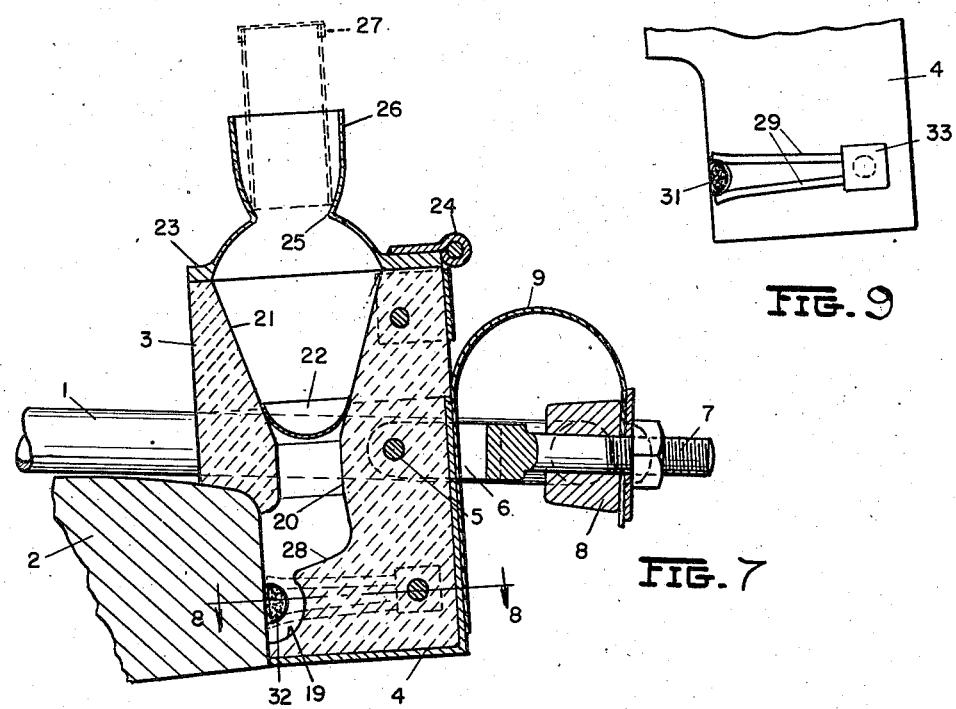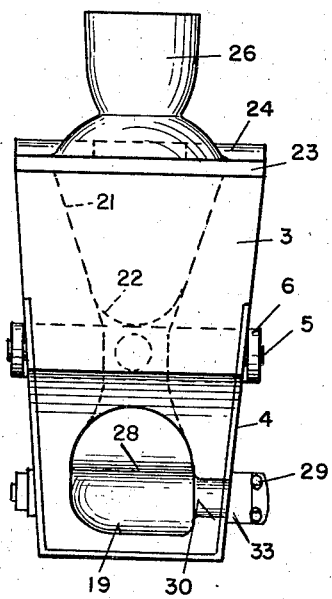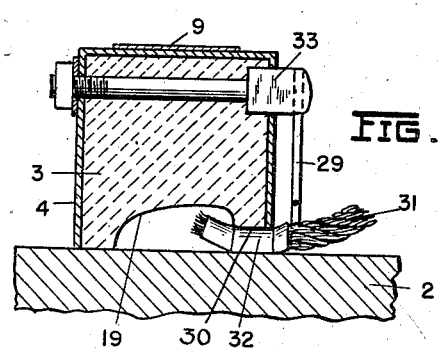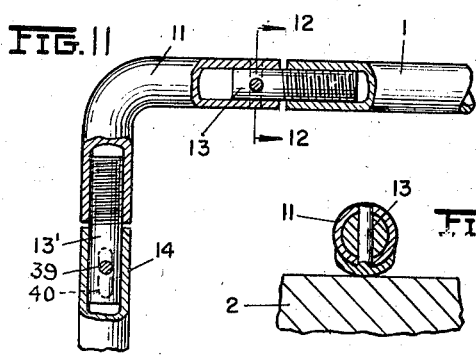

Patented May 28, 1946

2,401,048

UNITED STATES PATENT OFFICE 2,401,048

RAIL BONDING APPARATUS

Charles A. Cadwell, Cleveland, Ohio, assignor to The Electric Railway Improvement Company, Cleveland, Ohio, a corporation of Ohio Application January 13, 1941, Serial No. 374,229

6 Claims. (Cl. 263—48)

This invention relates as indicated to rail bonding apparatus and more particularly to a form of apparatus designed for attaching railway signal conductors by cast welding the ends of such conductors to the rails. This application is a continuation-in-part of application Serial No. 107,051, filed October 22, 1936, and Serial No. 370,015, filed December 13, 1940.

Various means have been suggested by workers in the art for cast welding the ends of rail bonds to rails but such means have not generally been conducive to rapid attachment of the bonds nor uniform in the results afforded. As disclosed in my co-pending applications Serial No. 245,954, filed December 15, 1938, now Patent No. 2,229,045 and Serial No. 243,394, filed December 1, 1938, I have invented a new method of attaching rail bonds involving the use of an exothermic reaction for the production of the necessary weld metal, and it is a particular object of the present invention to provide apparatus adapted for use in connection with such method.

Another object is to provide supporting means for the mold in which the terminal is cast, which means will readily permit removal of the mold from the rail even when the same is employed in relatively cramped locations, as adjacent switches, rail crossings, and the like.

A further object is to provide a crucible in which the exothermic reaction may take place, such crucible being adapted for rapid charging and cleaning.

Still another object is to provide an apparatus in which the various parts cooperate as a unit to aid in the rapid and secure attachment of the bonds.

Other objects of this invention will appear as the description proceeds.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

In said annexed drawings:

Fig. 1 is a top plan view of one embodiment of the apparatus of this invention showing the same mounted on the rail;

Fig. 2 is a side elevational view of the apparatus of Fig. 1 showing in dash line the position of the clamping means when the mold supporting frame is to be removed from the rail;

Fig. 7 is a vertical sectional view taken along the line 7—7 on Fig. 1;

Fig. 8 is a sectional view taken through the mold cavity along the line 8—8 on Fig. 7;

Fig. 9 is a side elevational view of the lower portion of the mold block showing the bond positioning means attached to such mold block;

Fig. 10 is an elevational view of the rail engaging face of the mold of this invention;

Fig. 11 is a fragmentary detailed view of a portion of the supporting frame showing the joints therein; and Fig. 12 is a sectional view through such frame taken along the line 12—12 on Fig. 11.

Figure 3:
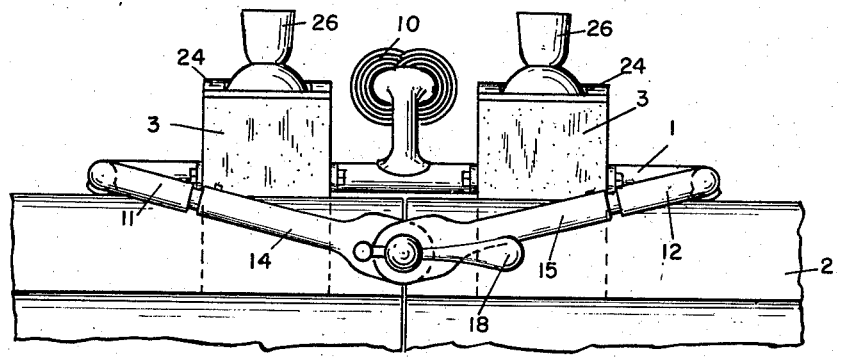
Fig. 3 is a rear elevational view of such apparatus showing the clamping means in engagement with the side of the rail head.

Referring now more specifically to such drawings, and especially Figs. 1 to 3, the rail bonding apparatus of this invention comprises a tubular frame 1 adapted to rest upon the top of the rail head 2 and support a pair of graphite mold blocks 3. The lower portions of such blocks are encased in copper shells 4, which may desirably be cast in place, through which pins 5 pass whereby such blocks are pivotally mounted in clevises 6. Such clevises are in turn supported in frame 1 by means of bolts 7 passing through bosses 8 of such frame. Leaf springs 9 are attached to the frame by the same bolting means and are interposed between said clevises and said molds to resiliently bear upon the faces of the molds opposite to the rail engaging faces thereof. A handle 10, similar to a stove plate handle, is attached to the frame mid-way between the two molds to facilitate handling of the same. Angle members 11 and 12 are pivotally attached to the respective ends of frame member 1 by means of threaded pins such as 13 (see Fig. 11). Overlapping extensions 14 and 15 are slidably connected to members 11 and 12, respectively, by similar pins 13′ provided with stop members 39 fitting in slots 40, and are themselves connected in their overlapping portions by means of a threaded rod 16 passing therethrough and carrying a clamping foot 17 loosely pivotally mounted on its inner end. An off-balance handle 18 is attached to the outer end and together with the steep pitch of the threads on rod 16 greatly facilitates rapid clamping and unclamping of the molds on the rail head. Thus, when the clamping means is elevated for removal of the apparatus from the rail, all parts of the frame lie in a plane above the rail head with only the molds depending.

The mold 3 is cut from a single graphite block and comprises a mold cavity 19 connected by way of a sprue passage 20 with the lower end of the downwardly tapering crucible 21. A thin cup-shaped tin plated steel gate 22 will desirably be employed to close the lower end of the crucible when the same is charged with the reactant material, such gate being melted by the heat of the reaction when the charge is ignited. Because of its shape the gate is substantially self-positioning in the bottom of the crucible. In other words, the rounded side walls of such gate, converging in a manner corresponding to the side walls of the crucible, cause such gate when dropped into the crucible automatically to seat itself in the sprue opening. A cover 23 for such crucible is attached to the top of the block by means of a hinge 24. Such cover arches upwardly over the crucible and is provided with a vent opening 25 centrally thereof so as to be aligned with the axis of the crucible, such opening being surrounded by a high, slightly flared, rim 26.

While the term "crucible" is conventionally applied to a chamber such as chamber 21 in which molten metal is produced by exothermic reaction, such chamber might more appropriately be termed a "combustion chamber," since the ignition of a charge within the chamber is followed more by an explosion than by a melting, and not only combustion gases but gases, metal and slag must find instantaneous egress or place if the apparatus is not to be blown to pieces or at least the products of the reaction scattered.

The cover constructed as aforesaid accordingly serves several purposes. In the first place, it prevents loss or damage to the charge due to rain or a high wind. In the second place, it prevents any spattering of molten metal which might otherwise occur. In the third place, it facilitates proper placement of the charge of reactant material in the crucible since a cartridge 27 of such material may be inverted in the upper rimmed portion of the cover, as illustrated in Fig. 7, and discharge its contents uniformly and centrally into the crucible. Such placement of the charge tends to ensure a complete and uniform reaction of all of the material. The ignition powder originally in the bottom of the cartridge will now be on top of the charge in the crucible, properly disposed to be ignited. This may be done by dropping a match through the vent opening or preferably by means of a spark gun discharged through such opening.

A step or shelf 28 is provided in the lower end of sprue opening 20 so that the stream of molten metal dropping down from the crucible may be caused to spread out and impinge at an angle against the face of the rail head. This ensures firm attachment of the terminal to the rail even when the very small amount of metal employed in the attachment of signal bonds is dropped into the mold cavity, while at the same time danger of gouging the rail or of excessive local modification of the crystalline structure of the steel is avoided.

Pronged gripper means 29 are provided adjacent the cavity 30 through which the bond 31 passes to enter main mold cavity 19. Such gripping means are located to seize the bond just back of the sleeve 32 and hold such bond in proper position while the apparatus is being clamped in place. Such sleeve is so formed, as illustrated in Fig. 8, that the strands protruding therefrom are held at an angle away from the rail face to permit complete interfusion of the same with the weld metal. The said pronged gripper means are fastened to the mold block by means of a square headed bolt 33 passing through such block and metal shell 4. The two molds are identical except for the location of cavities 30 and such gripper means which must of course face each other.

In operation, the bond will be placed with its ends in the respective mold cavities and the apparatus rested on the rail head. The portion of the frame carrying the clamping means will then be depressed from the dash line position to the solid line position, as illustrated in Fig. 2, and clamping foot 17 will be brought into tight engagement with the rail head, the leaf springs 9 permitting the necessary slight automatic adjustment of the molds to the rail face. The cup-shaped metal gates are next dropped into the crucibles and the hinged covers lowered. The crucible is next charged as above described, the charge ignited and the mold cavity filled with the molten welding metal. The apparatus may then be removed from the rail, it only being necessary to release the clamp and elevate the same whereupon the mold may be withdrawn sufficiently laterally of the cast terminal to permit the apparatus to be removed. It is obvious that such apparatus may thus be operated in relatively restricted locations where there is not room for bulky frame members below the level of the rail head. A shell of slag will generaly have been formed within the crucibes during the reaction and it is necessary that such shell should be removed prior to further use of the apparatus. This may often be accomplished simply by inverting the device whereupon such shells drop out, or if necessary they may be easily broken and assisted to drop out as with a pen knife, screw driver, or the like. This method of ready removal of the slag is of course made possible by the outward tapering walls of the crucible.

Figure 4:
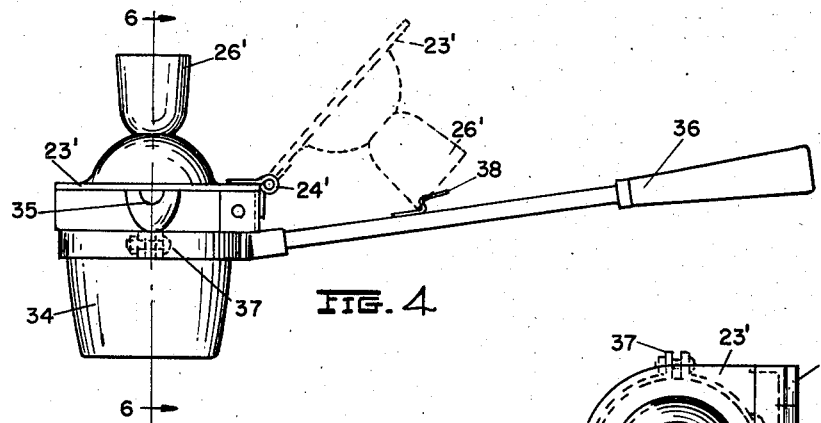
Fig. 4 is an elevational view of one embodiment of the crucible of this invention adapted for pouring rather than the discharge of the molten metal through a sprue opening.
Figure 5:
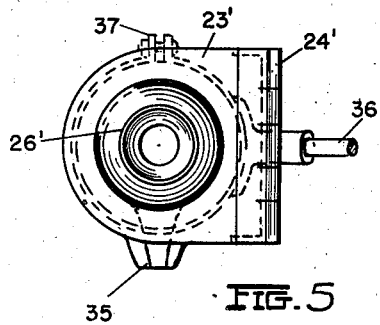
Fig. 5 is a top view of the device of Fig. 4.
Figure 6:
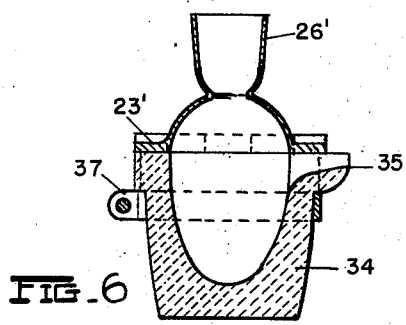
Fig. 6 is a vertical sectional view taken along the line 6—6 on Fig. 4.

In the embodiment of the crucible illustrated in Figs. 4 to 6, the crucible 34 is provided with a pouring lip 35 instead of a sprue opening, and a handle 36 is attached thereto by means of a clamping ring 37. The charging cover 23', which is similar in form with that previously described, is hinged to the crucible on the side toward the handle so that it may not inadvertently close during the pouring operation. A spring grip 38 is provided on the handle to further ensure that the cover, when raised as shown in dash line in Fig. 4, will not accidentally close during the pouring. This form of crucible is particularly adapted for use in the production of relatively large charges of molten metal produced by exothermic reaction, such molten metal then being poured into molds in which the ends of the conductors have been positioned in a conventional manner.

It will be seen from the foregoing that the aims of this invention have been achieved in a relatively simple manner and in such a way as to permit of rapid and effective attachment of bonds to rails.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. For use with a cylindrical cartridge of material for producing molten metal by exothermic reaction, a crucible having a sprue opening in the bottom thereof, and a cover for said crucible hingedly mounted thereon, said cover having a circular opening therein axially of said crucible and a raised circular rim about such latter opening of slightly greater diameter than such opening to permit insertion of a cartridge of a predetermined diameter within said rim without permitting such cartridge to drop through the opening in said cover.

2. For use with material for producing molten metal by exothermic reaction, a crucible having walls converging to a sprue opening at the bottom thereof, and a cup-shaped gate having correspondingly converging side walls whereby said gate is adapted automatically to seat itself in such opening when dropped into said crucible, said gate being destructible by the heat of the reaction.

3. For use with material for producing molten metal by exothermic reaction, a crucible having walls converging to a sprue opening at the bottom thereof, and a cup-shaped gate having rounded side walls whereby said gate is adapted automatically to seat itself in such opening when dropped into said crucible, said gate being made of metal fusible by the heat of the reaction.

4. For use with material for producing molten metal by exothermic reaction, a crucible, a cover therefor having an opening axially of said crucible to permit charging of the latter, and means associated with such opening adapted to receive and locate the end of a charge-containing cartridge.

5. For use with material for producing molten metal by exothermic reaction, a crucible, a cover therefor having an opening axially of said crucible to permit charging of the latter, and a rim surrounding such opening adapted to receive and locate the end of a charge-containing cartridge.

6. For use with material for producing molten metal by exothermic reaction, a crucible, a cover therefor of downwardly flaring form having an opening axially of said crucible to permit charging of the latter, and an upwardly directed, outwardly flaring rim surrounding such opening and adapted to receive and locate the end of a charge-containing cartridge.

CHARLES A. CADWELL.